UNITED STATES PATENT OFFICE 2,254,785

PROCESS FOR GUM REFINING

Wiley C. Smith, Arlington, Va., Jesse O. Reed, Washington, D. C., Fletcher P. Veitch, College Park, Md., and George P. Shingler, Lake City, Fla., assignors to Henry A. Wallace, as Secretary of Agriculture, of the United States of America, and to his successors in office No Drawing. Application August 19, 1940, Serial No. 353,244

3 Claims. (Cl. 260—107)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

Our invention comprises a process of purifying crude oleoresin by which oleoresins and derived rosins containing no undissolved extraneous matter can be obtained.

Undissolved extraneous matter in rosin decreases its industrial value; also by reducing the brightness and transparency it tends to lower the grade of the rosin, and consequently its market value. In examining a lump of commercial rosin through a magnifying glass, particles of extraneous matter of varying sizes will be seen more or less uniformly scattered throughout the mass. Our investigations have shown that crude oleoresin from which all visible foreign material has been removed by filtration alone will still produce a rosin that contains visible particles of matter. From this it is apparent that some treatment other than filtration of the crude oleoresin is necessary to produce a clean, bright, and transparent rosin.

Oleoresin as it exudes from the scarified portion of the tree is a clear, almost colorless, and somewhat viscous solution of resin acids in a volatile oil, identified as gum spirits of turpentine. As this oleoresinous exudation slowly flows over the scarified face of the tree into a collecting receptacle it is subject to contamination of various kinds and to physical and chemical changes. Not only is some of the volatile oil or turpentine lost by evaporation, but oxidation modifies the unsaturated compounds comprising many of the constituents of oleoresin. Pine needles, chips, fine pieces of bark, dust, insects, etc., are caught by the sticky surface of the oleoresin on the tree, or fall into the collecting receptacle. Our experiments show that this visible solid material can be filtered readily from the oleoresin.

Crude oleoresin as collected is further contaminated with materials not removable by filtration, such as water containing water solubles. The amount of water and water solubles present in crude oleoresin as collected will vary, since this contamination is largely due to rain-water entering the collecting receptacle either directly or by running down over the bark of the tree. Rain-water, however, is not the sole source of the "water" present in the oleoresin. Between the wood and bark of a living pine tree there is a very thin tissue or layer of cells, called the cambium, which yearly builds a layer of wood at its inner boundary and a layer of soft inner bark or phloem at its outer boundary. Through this layer or tissue pass the dissolved products, as sap, which enable the tree to live, grow, and store reserve supplies. In scarifying the tree for the production of the crude oleoresin, the cambium and phloem tissues are cut and exposed, causing the exudation, along with oleoresin, of the products contained within this tissue. Investigations have shown that this tissue exudation is water soluble, rich in tannin and other complex organic compounds, many of which are subject to oxidation at ordinary temperatures and to decomposition at the temperatures at which rosin is made from crude oleoresin. It is these compounds held in solution by the water contaminating the gum along with the water extractives in the chips, bark, leaves, etc., obtained in heating the gum, that cannot be removed from crude oleoresin by filtration. Our investigations have shown the need of a new and useful process for removing these water-soluble materials to produce a purified oleoresin capable of producing a rosin free of all visible particles.

Most of the methods for refining crude oleoresin have originated in France and are based on filtration alone. A common method is to cause the oleoresin to pass through the filter medium either by gravity or by pressure obtained by partial vacuum, steam pressure, hydraulic pressure, either by a pump or displacement in a closed vessel, or by centrifuging. To facilitate filtration the oleoresin is usually heated to obtain a free flowing material. In order to prevent losses from evaporation the temperature is below the temperature of distillation. Heating is done either indirectly by a jacketed vessel, directly by a fired vessel, or introduction by live steam, or by both. Due to inability to obtain satisfactory filtration with available filtering equipment and materials, many of the French processes include a settling stage in which the hot oleoresin is held over a period of time at a temperature at which much of the finer material settles to the bottom of the tank or gum layer. The oleoresin at the top of the settling vessel is removed by decantation. To facilitate separation by gravity, the French, as early as 1883, mixed salt and salt water with the gum so that the oleoresin, after standing for several hours, would float on the brine layer.

Although our process utilizes some of the methods above cited, it does not employ water-soluble materials such as salt or sodium carbonate, developed in the nineteenth century by Fouque, Col and Lesca of France, as a means of effecting a separation of the water from crude oleoresin. In the heating and filtering of crude oleoresin, a rather stable gum-water emulsion is formed which can be readily broken and the water separated by the use of salt and brine, but our investigations show that water is also soluble in the oleoresin, the degree of solubility being much greater at the gum-melting temperatures than at lower temperatures. For this reason, salt (NaCl) and other water solubles that may be used to effect a more complete settling and break the gum-water emulsion are retained by the gum in solution along with some of the water solubles originally in the gum. The presence of salt brine in refined oleoresin is considered as undesirable as the water solubles originally present, except that on the basis of brightness or color, salt-contaminated oleoresin may produce a rosin of improved color, since the presence of salt in rosin is not nearly as evident as other extraneous matter part of which may have been removed by the salt settling process.

Our invention relates to a process which refines crude oleoresin without the addition of extraneous matter or materials foreign to the original crude gum.

Our investigations have further shown the necessity of filtering from the crude oleoresin all visible extraneous matter contaminating the oleoresin before removing the water-soluble materials. We have found that upon heating the crude oleoresin to facilitate filtration, the water present extracts additional water solubles from the bark, chips, leaves, etc., in the crude unfiltered gum. These water solubles cannot be removed by filtration and must, therefore, be removed in a separate step in the refining process following filtration. Unsatisfactory results have been obtained in large-scale experiments in which an effort was made to remove the water solubles by washing before filtration.

Our process takes advantage of the physical properties of crude oleoresin and of its distillate, turpentine. The specific gravity of oleoresin at ordinary temperatures is slightly greater than that of water, while the specific gravity of turpentine is approximately 0.868. Dilution of the crude oleoresin, with a sufficient quantity of turpentine, not only reduces the viscosity of the said oleoresin but also lowers its density below that of water. By heating the diluted oleoresin there is a further marked decrease in the viscosity and density. As an illustration, crude oleoresin diluted to a turpentine content of 40 percent has a density of approximately 0.98 gm./cc. at 20° C., approximately 0.96 gm./cc. at 50° C., approximately 0.94 gm./cc. at 70° C., and 0.92 gm./cc. at 100° C. Likewise the viscosity of the oleoresin diluted to turpentine content of 40 percent, although somewhat viscous at 20° C., becomes quite free-flowing at 60° C., and is only slightly more viscous than water at 100° C. It can be seen therefore that by dilution with turpentine in sufficient quantities and by heating, a free-flowing solution, that can be readily filtered with a pressure type of filtering equipment, can be obtained. Furthermore, by diluting the crude oleoresin with turpentine it is possible to obtain a solution which, upon heating, will have a density sufficiently below that of water to break the gum-water emulsion and cause the water portion to settle to the bottom of the tank.

The results of our investigations show that the separation by dilution, heating, and settling of the undissolved water contained in the water-oleoresin emulsion alone is not sufficient to remove all of the water-soluble constituents. This is due to the solubility of water in oleoresin. After the water present in the oleoresin has separated and settled to the bottom of the tank our investigations show the advantages of first draining off the water portion, then adding fresh hot water to the demulsified gum with violent stirring, or other means, to cause intimate contact between the oleoresin and water. The violent mixing of the fresh hot water with the demulsified filtered oleoresin washes from the said oleoresin the water solubles retained by the gum in solution and in suspension after the settling operation. The effectiveness of the washing operation is dependent upon the amount of water used, the degree of agitation, temperature, percent of dilution, and the physical and chemical properties of the crude oleoresin which vary during the oleoresin producing season. After a thorough washing, the water residue settles to the bottom of the tank and is withdrawn.

We have developed an alternate method of washing which consists of running the diluted filtered oleoresin through a series of conventional tanks partly filled with hot water and provided with baffles or packing which will bring the said oleoresin in more intimate contact with the said hot water. The rate of introducing fresh hot water to the washing tanks is controlled so that satisfactory washing of the oleoresin is obtained. For most satisfactory operation, the flow of wash water is counter to the flow of the oleoresin, and is continuous.

In general, in carrying out the purposes of our invention, the crude oleoresin is heated and melted in a closed chamber or tank to a temperature ranging from 210° to 240° F. To facilitate filtering, water separation, and washing, freshly distilled turpentine may be added to the oleoresin before, during, or after the gum is melted. By heating the gum to a temperature above the temperature of distillation in the closed vessel there is produced a vapor pressure which usually is sufficient to force the melted gum through a pressure-type filter. A coarse screen may be used to remove the larger pieces of foreign matter which may otherwise close the pipe connection leading from the closed tank to the filter. The quantity of turpentine required for diluting the melted gum for satisfactory filtration depends upon the quantity of refuse and chrystalline material existing in the original crude oleoresin.

As an example of the process in accordance with our invention, we prefer to dilute the oleoresin so that the turpentine content is approximately 35 to 50 percent of the total products which would be obtained by distillation. One of the preferred methods is to add a portion of the fresh turpentine during the melting stage, for example, a sufficient quantity to dilute the oleoresin to 30 percent turpentine content. This diluted oleoresin is then filtered. The remaining turpentine required to give a 35 to 50 percent turpentine dilution of the original gum is then introduced into the closed pressure tank and by heating is used to dissolve and recover the oleoresin in the refuse remaining in the pressure tank, filter, and pipe lines. A recovery of the turpentine remaining in the refuse is obtained by blowing live steam through the system. The filtered diluted oleoresin and the turpentine used in washing the refuse are collected in a steam-jacketed tank in which one of the preferred methods of the settling and washing phases of our process is performed.

Another preferred method of performing the melting and filtering steps in accordance with our invention is to introduce at one time the entire amount of turpentine required for dilution, followed by heating, melting the oleoresin at as low a temperature as possible, filtering, and recovering the oleoresin remaining in the pressure tank, pipe lines, and filter by live steam. The filtered products are collected in a closed tank in which the washing and settling are performed.

A preferred method in the washing stage of our process is to allow the water contamination in the filtered diluted oleoresin to settle to the bottom of the tank where it can be drained off. At a temperature ranging from 150° to 180° F., water, preferably deaerated, is introduced into the filtered gum and vigorously mixed and stirred, giving the gum a thorough washing. An increase in dilution of the oleoresin will result in decrease in the temperature required to obtain a free flowing and washable material. Dilution to a 50% turpentine content will produce a free flowing, washable, diluted oleoresin at room temperature. On standing, the wash water settles to the bottom of the tank and is drained off. The amount of water required for a thorough washing depends upon the varying physical and chemical characteristics of the oleoresin.

Another preferred method of the washing operation is to eliminate the preliminary settling of the water after filtering by running the diluted filtered oleoresin into the bottom of a tank partly filled with water, at a temperature sufficient to cause effective separation of the oleoresin from the water, and provided with tower packing, baffles, or a jet which will bring the said oleoresin in more intimate contact with the hot water. More complete washing later is obtained by the addition of more hot water to the tank along with stirring or agitation.

Another preferred method of washing is similar to the above except that the oleoresin is run continuously through a series of tanks filled with hot water, thereby eliminating the final washing by agitation. The tanks must be of such size that settling can take place while the oleoresin goes from one tank to the other.

Another preferred method which has given very satisfactory experimental results is the washing of the diluted oleoresin and the separation of the water in one continuous operation by means of a centrifuge.

We do not limit ourselves to any particular apparatus for carrying out our process, nor to the use of any particular temperature in such treatment, nor to the use of any particular dilutions, it being obvious that oleoresin varies in quality, composition, and physical properties which will require various modifications in its treatment and handling. We do not limit ourselves to turpentine as a diluting material since it is possible to use other solvents that will accomplish the same results as are obtained with turpentine. We prefer to use turpentine, because in its use no distillation problems for the complete recovery of the solvent are involved. Oxidized or old turpentine is not considered as satisfactory as fresh turpentine because in distillation of the refined oleoresin there is an indication that the oxidized products in old turpentine have a tendency to remain in the rosin.

The refined oleoresin, the product obtained by our process, can be distilled in the usual manner to yield turpentine and rosin, or partially distilled, preferably in vacuum, so that a portion of the turpentine remaining in the oleoresin acts as a solvent and provides a product which in commerce can be handled in the same manner as other viscous liquids. The product obtained by either method of distillation will be bright and free of undissolved extraneous matter.

We do not limit ourselves to washing from oleoresin the water-soluble products common to crude oleoresin but include all water soluble products which may be present or added to the oleoresin such as salt (NaCl), introduced at some stage in the refining process.

Having thus described our invention, what we claim for Letters Patent is:

1. A process of refining crude oleoresin, which comprises diluting crude oleoresin with turpentine to a turpentine content of 35% to 50% of the resulting mixture; thence heating the mixture until the oleoresin is melted; thence filtering; thence allowing the water in the filtered crude oleoresin to separate and settle; thence removing the said settled water; thence adding water at a temperature sufficient to cause effective separation of the oleoresin from the water, the while vigorously agitating the mixture, thereby causing the water to wash from the said oleoresin the water solubles retained in solution and suspension after the said preliminary settling operation; thence allowing the wash water to settle out from the washed and agitated oleoresin; thence recovering the refined diluted oleoresin capable of making a bright and transparent rosin.

2. A process of refining crude oleoresin, which comprises subjecting crude oleoresin in a closed chamber to the action of heat at a temperature ranging from 210° F. to 240° F.; thence filtering the melted oleoresin; thence adding turpentine to said oleoresin, thereby dissolving and recovering the crude oleoresin remaining from the said filtering operation; thence adding additional turpentine to the filtered oleoresin in an amount sufficient to give a turpentine content of 35% to 50% of the resulting mixture; thence allowing the water containing the water solubles remaining in the filtered oleoresin to separate and settle; thence removing the said settled water; thence adding fresh water to the residual oleoresin, the while violently agitating the mixture, thereby causing water to wash from the said oleoresin the water solubles retained in solution and suspension after the said preliminary settling operation; thence allowing the wash water to settle out from the washed oleoresin; thence recovering the water soluble free oleoresin.

3. A process of refining crude oleoresin, which comprises diluting the crude oleoresin with turpentine to a turpentine content of 35% to 50% of the resulting mixture; then heating and agitating the mixture until the oleoresin is melted; thence filtering; thence washing the filtered crude oleoresin with water at a temperature at which the filtered, washed oleoresin readily separates from the wash waters, thereby causing the water to wash from the said oleoresin the water solubles retained in solution and suspension; thence allowing the wash water to settle out from the washed oleoresin; thence recovering the refined diluted oleoresin capable of making a bright and transparent rosin.

WILEY C. SMITH.
JESSE O. REED.
FLETCHER P. VEITCH.
GEORGE P. SHINGLER.